Feb. 1, 1944.  W. C. TROENDLE  2,340,288
WHEEL
Filed June 8, 1942
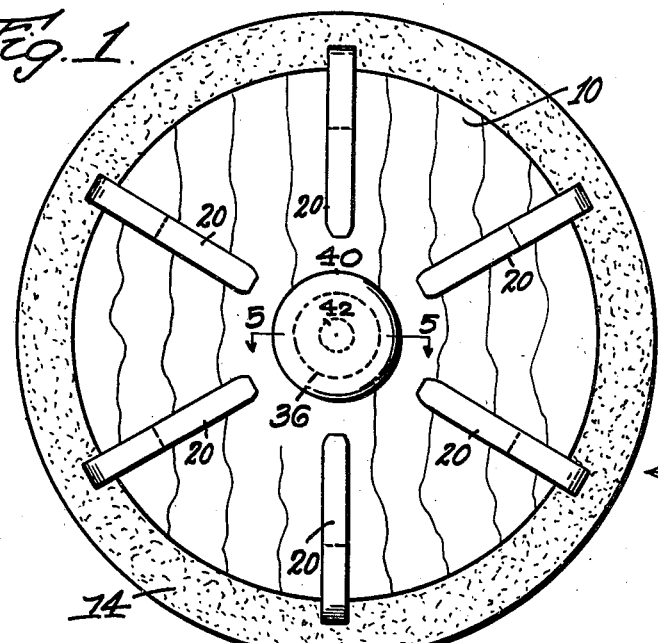
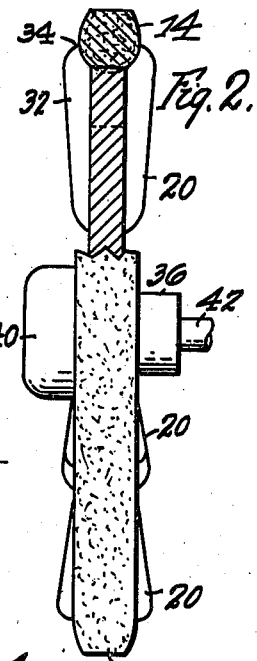
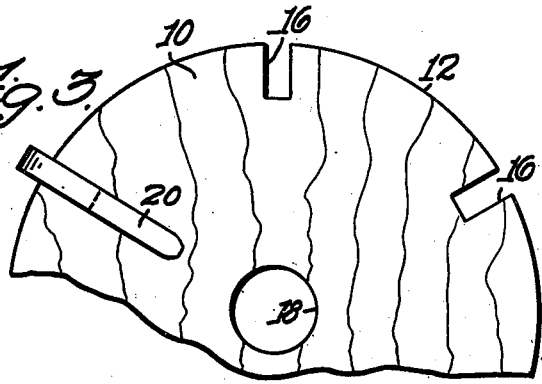
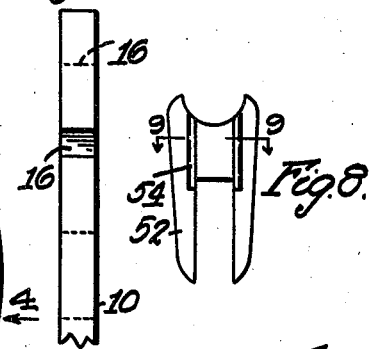
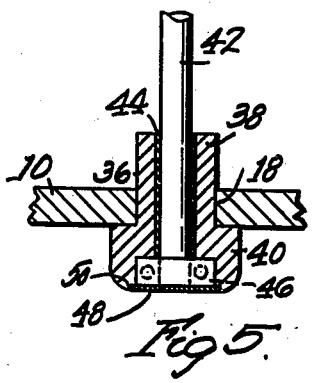
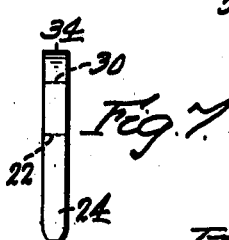
Inventor
William C. Troendle
by attorney
Charles R. Fay Patented Feb. 1, 1944

2,340,288

UNITED STATES PATENT OFFICE 2,340,288

WHEEL

William C. Troendle, Gardner, Mass., assignor to Thayer Company, Gardner, Mass., a corporation of Massachusetts Application June 8, 1942, Serial No. 446,263

8 Claims. (Cl. 152—375)

This invention relates to wheels especially adapted for use in light vehicles such as baby carriages, velocipedes, and the like.

The objects of the invention include the provision of a non-metallic wheel having a tire separate from but firmly secured about the periphery of the wheel; the provision of a wheel having no rim in the conventional sense but provided with generally radial spoke-simulating elements providing means for retaining the tire in position on the wheel; the provision of a non-metallic rim-less wheel having spaced means at its periphery extending beyond the latter both radially and transversely of the wheel to securely anchor a demountable tire; and the provision of a wheel as above described which may be entirely made of wood, plastics, or other easily obtainable materials, or combinations thereof.

A further object of the invention includes the provision of a non-metallic wheel comprising a circular disc having a series of spaced slots arranged radially and extending inwardly from the periphery thereof for a short distance; a plurality of lugs having end-slots adapted to be slid into the wheel-slots, said lug slots each forming a pair of legs for engagement with opposite lateral surfaces of the disc, and each lug having a solid portion at the closed end of its slot, said solid portion being formed to present a concave recess for receiving and holding a separate tire against lateral displacement.

Other objects and advantages of the invention will appear hereinafter.

Reference is to be had to the accompanying drawing, in which

Fig. 1 is a front elevation of a wheel embodying the invention;

Fig. 2 is a view in elevation of the wheel looking in the direction of arrow 2 in Fig. 1, parts being in section;

Fig. 3 is a front elevation of the wheel disc showing how the lugs are assembled;

Fig. 4 is a view in elevation of the disc looking in the direction of arrow 4 in Fig. 3;

Fig. 5 is a section on line 5—5 of Fig. 1;

Fig. 6 is a front elevation of a lug;

Fig. 7 is a side elevation thereof; and

Figs. 8 and 9 disclose a modified tire lug, Fig. 9 being a section on line 9—9 of Fig. 8.

In the drawing the reference numeral 10 indicates a circular disc which may be made of any material desired or convenient, such as solid wood, plywood, plastic material, etc. The periphery 12 of this disc is to provide a seat for a tire 14, and in this case the disc has a thickness substantially equal to the width of the inner peripheral aspect of the tire for this purpose, as is clearly shown in Fig. 2. A series of comparatively short radial slots 16 are formed in the disc 10 and these slots extend inwardly from the periphery of the disc a desired distance. In the present case, six slots are disclosed, as this has been determined to be the most economical number possible to be used, but it is not desired to be limited to this number, as more or less might be used in different forms of the invention. Also, a central aperture 18 is provided in the disc for a purpose to be described.

Tire-retaining lugs 20, which may be made of wood, plastic, etc., are each formed with a slot 22 extending longitudinally thereof from one end to form a pair of legs 24. These legs, while having straight, parallel inner sides 26, may have their outer sides divergent in the direction of the slot extent to provide an enlarged head 28, at the end of the lug opposite the slot. This head is provided with a concave recess or slot 30 extending from side to side of the lug to form a pair of ears 32, and these ears may be curved or ornamented at their outer aspects in any desired manner so as to form relatively sharp edges 34. The form of recesses 30 is the same as the cross-sectional shape of the inner periphery of the tire, see Fig. 2, and if desired the bottoms of the recesses may be made flat for this purpose although they are here illustrated as rounded.

To assemble the wheel, a lug 20 is slid endwise into each disc slot 16 with legs 24 engaging opposite lateral side surfaces of the disc. Each slot 16 is of a length equal to the distance between the bottoms of slots 22 and recesses 30 so that the head portions 28 just fit slots 16, leaving the ears 32 extending radially outwardly of the disc periphery a substantial distance. When all the lugs have been inserted in their disc slots, the tire 14 is stretched over the ears, and the result is that the tire is very firmly held in the lug recesses, and by its own tension it holds the lugs firmly seated against any possibility of removal thereof. The result of this construction is to provide a completely non-metallic wheel of high rigidity and strength without the necessity of using a rim, while the lugs 20 provide spoke-simulating and otherwise ornamental elements which may be of contrasting color to the disc if desired.

The central aperture 18 in the disc is provided for receiving a hub 36. This hub comprises a barrel 38 fitting the aperture and an enlarged head 40 for seating against the outward surface of the wheel. The barrel and head are hollow and may directly receive the vehicle shaft 42 or a sleeve 44 may be provided for a wearing journal. The shaft may have a cotter pin or a bearing 46 as shown, and an enlargement in the hollow portion of the head is provided to accommodate the same. A closure cap 48 is snapped into a shoulder groove at 50 to close the hub, but a cover cap of any desired kind may be utilized for this purpose. The hub may be made of wood, plastic, etc., in the same manner as the rest of the wheel, and as illustrated it carries the shaft 42. However, in cases where a single wheel is to be used, as in the front wheel of a velocipede, obvious changes in the hub may be made for this purpose.

In the modification of Figs. 8 and 9 the tire lug 52 is similar to lug 20 but in addition it is provided with shoulders 54 for engaging the lateral sides of the disc 10 to further steady and rigidify the lugs against movement transversely of the wheel.

Having thus described my invention and the advantages thereof, I do not wish to be limited to the details herein disclosed, otherwise than as set forth in the claims, but what I claim is:

1. A wheel comprising a disc, a slot in said disc, a single unitary tire lug mounted in said slot, and means on said lug for maintaining a tire against lateral movement relative to said disc, said means comprising a pair of ears integral with the lug.

2. A wheel comprising a disc, a plurality of separate tire lugs adapted to be mounted on said disc, means on said disc to receive said tire lugs in spaced relation about the periphery of the disc, and means on the tire lugs to receive and hold a tire against transverse movement on said disc, said last named means comprising a pair of integral spaced ears on each lug.

3. A wheel comprising a disc, a series of spaced substantially radial slots in said disc, a plurality of tire lugs each having a pair of legs for engaging the lateral surfaces of said disc and a solid portion for reception in a slot, means on each tire lug extending radially outwardly past the edge of the disc, said means being effective to engage and hold a tire, said tire being adapted to exert a radial force to maintain said lugs in fixed relation to the slots.

4. A wheel comprising a disc having a series of substantially radial slots intersecting the periphery of the disc, a plurality of tire lugs each having a portion for entry in a slot, means on each lug engaging the lateral sides of the disc, a pair of ears on each lug extending radially outwardly of the disc to receive between them a tire, said tire exerting a radial force on said lugs in a direction centrally inwardly of the disc.

5. A wheel comprising a disc, a series of circumferentially spaced radial slots in the edge of the disc, a plurality of tire lugs, each lug having a pair of legs defining a slot therebetween and a solid portion at the closed end of the slot, said lugs being slidable radially inwardly of said disc in said slots so that their legs straddle the disc and the solid portions rest in the disc slots, and means on said tire lugs for receiving a tire.

6. A wheel according to claim 5 wherein said means comprises a pair of lateral ears on each lug, the tire being received between the ears.

7. A wheel according to claim 5 wherein said means comprises a pair of spaced ears on each lug, said ears extending radially outwardly beyond the edge of the disc and laterally outwardly of the sides of the disc.

8. A wheel comprising a disc, said disc having a circumferential edge for seating a tire, a plurality of spaced tire lugs on said disc and extending radially of said disc outwardly past said edge, said lugs each having means forming a tire-receiving recess, said means comprising a pair of spaced ears for each lug for engaging the opposite sides of the tire when the latter is seated on said disc edge, said tire lugs being separable from said disc, and said tire maintaining said lugs in fixed relation on the disc.

WILLIAM C. TROENDLE.